United States Patent [19]

Kim

[11] Patent Number: 5,751,361
[45] Date of Patent: May 12, 1998

[54] METHOD AND APPARATUS FOR CORRECTING ERRORS IN A TRANSMITTED VIDEO SIGNAL

[75] Inventor: Jin-Hun Kim, Seoul, Rep. of Korea

[73] Assignee: Daewoo Electronics Co., Ltd., Rep. of Korea

[21] Appl. No.: 769,831

[22] Filed: Dec. 20, 1996

[30] Foreign Application Priority Data

Dec. 23, 1995 [KR] Rep. of Korea .................. 95-55647

[51] Int. Cl.$^6$ ........................................ H04N 7/68
[52] U.S. Cl. .................. 348/409; 348/420; 348/607; 348/616
[58] Field of Search ........................ 348/384, 409, 348/420, 469, 607, 616; 386/50; H04N 7/68

[56] References Cited

U.S. PATENT DOCUMENTS

| | | | |
|---|---|---|---|
| 5,142,537 | 8/1992 | Kutner et al. | 371/31 |
| 5,146,325 | 9/1992 | Ng | 348/384 |
| 5,212,549 | 5/1993 | Ng | 348/409 |
| 5,247,363 | 9/1993 | Sun | 348/616 |
| 5,267,021 | 11/1993 | Ramchandran | 348/469 |
| 5,621,467 | 4/1997 | Chien | 348/409 |

FOREIGN PATENT DOCUMENTS 0 607 042  7/1994  European Pat. Off. .

*Primary Examiner*—Howard W. Britton
*Attorney, Agent, or Firm*—Pennie & Edmonds LLP

[57] ABSTRACT

An apparatus for use in a video signal decoding system for concealing errors in a video signal first detects a lost block in the video signal, the lost block having errors, and then provides pixel values of neighboring blocks for the lost block in the video signal based on information for the lost block. Subsequently, The apparatus computes edge gradients of neighboring pixels included in a predetermined range of pixels surrounding the lost block based on the pixel values of the neighboring blocks and determines a pixel interpolation direction based on the edge gradients of neighboring pixels. A spatially interpolated block is produced based on the pixel values of the neighboring blocks and the pixel interpolation direction and it is provided as a substitution block for compensating the lost block.

25 Claims, 5 Drawing Sheets

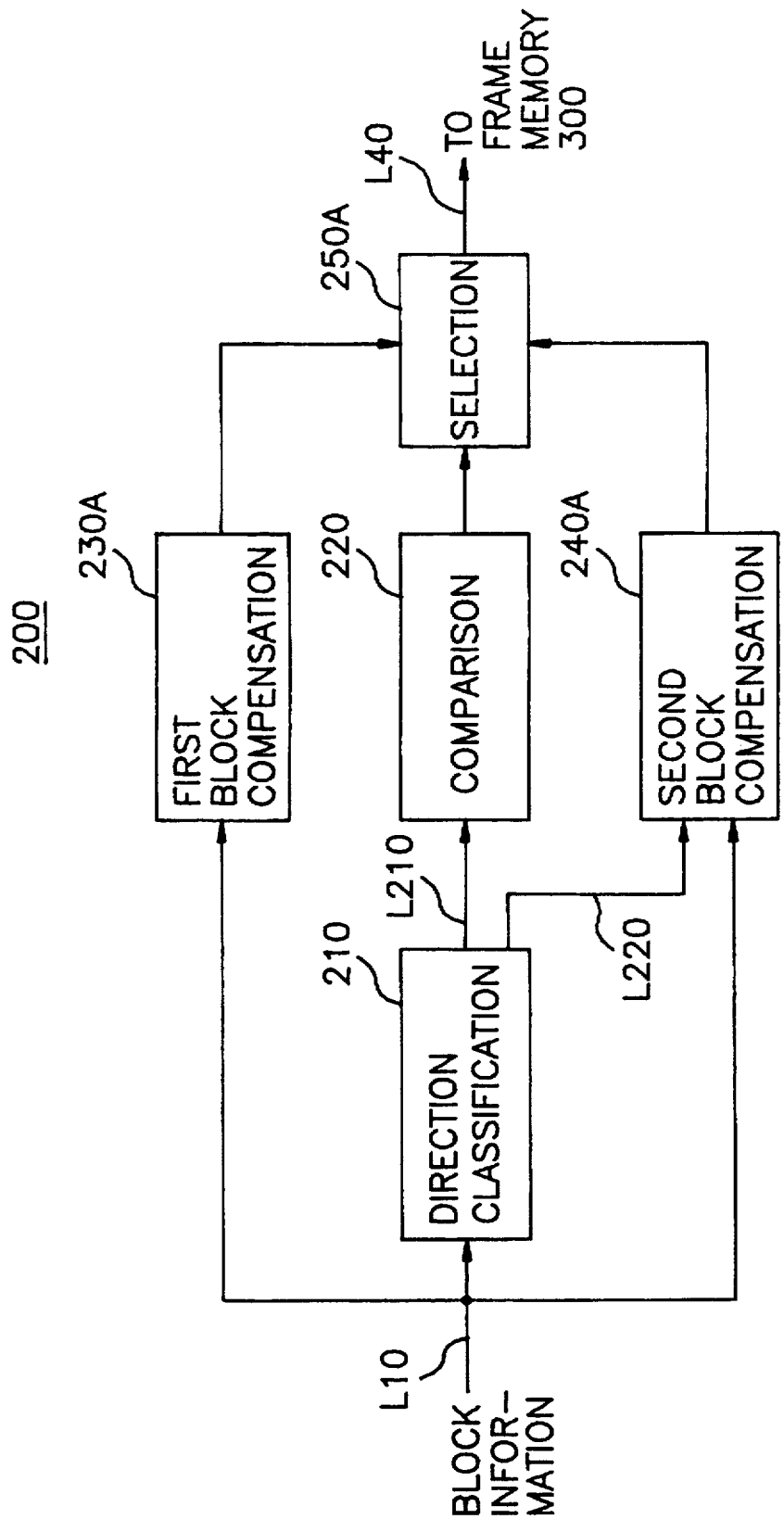

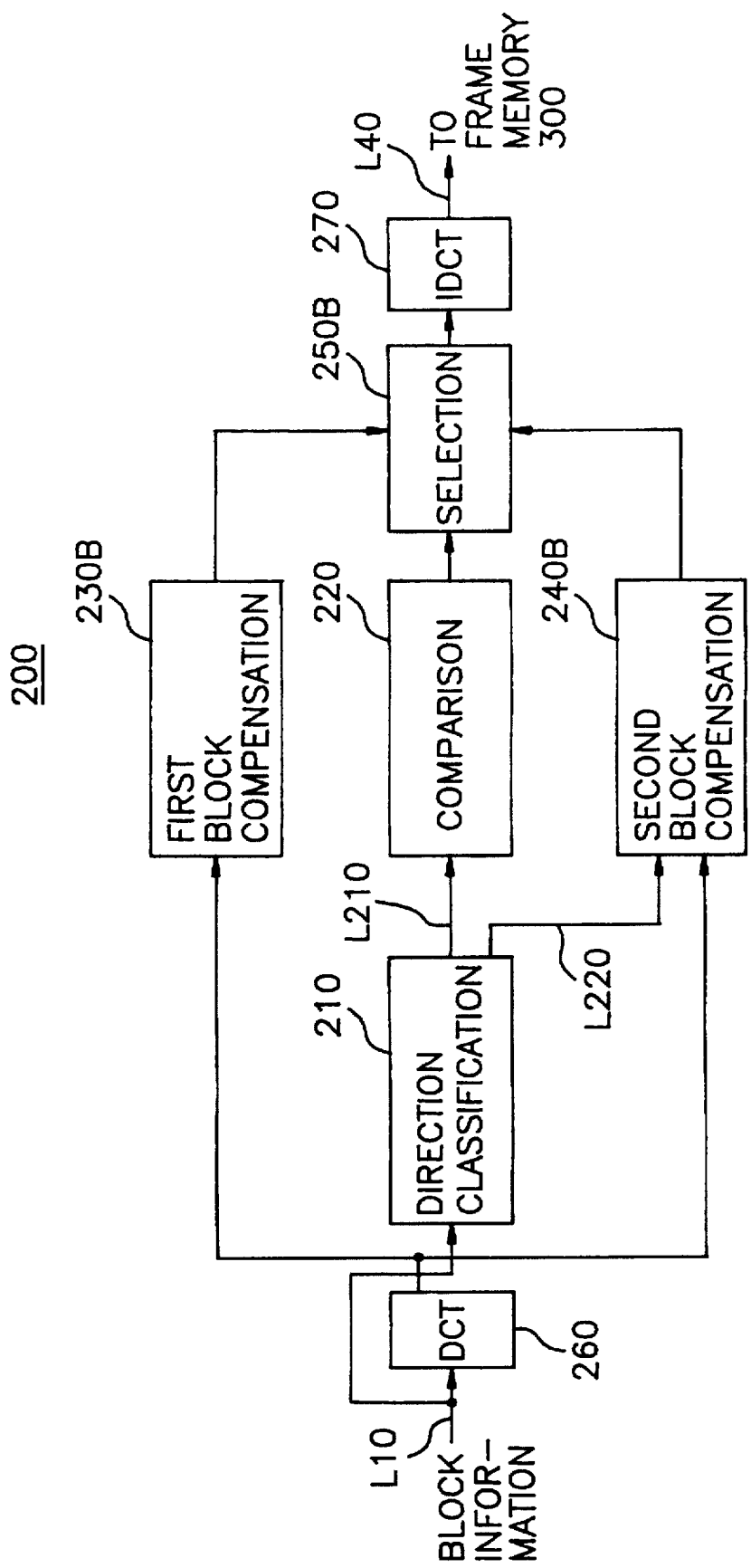

FIG.4

| BLOCK 1 | BLOCK 2 | BLOCK 3 |
|---------|---------|---------|
| BLOCK 4 | BLOCK 0 | BLOCK 5 |
| BLOCK 6 | BLOCK 7 | BLOCK 8 |

METHOD AND APPARATUS FOR CORRECTING ERRORS IN A TRANSMITTED VIDEO SIGNAL

FIELD OF THE INVENTION

The present invention relates to a method and apparatus for use in a video signal decoding system having an error concealment; and, more particularly, to a method and apparatus for concealing errors present in a decoded video signal transmitted in a compressed form.

DESCRIPTION OF THE PRIOR ART

As is well known, transmission of digitized video signals can attain video images of a much higher quality than the transmission of analog signals. When a video signal is expressed in a digital form, a substantial amount of data is generated for transmission, especially in the case of a high definition television(HDTV) system. Since, however, the available frequency bandwidth of a conventional transmission channel is limited, in order to transmit the substantial amount of digital data therethrough, it is inevitable to compress or reduce the volume of the transmission data.

In conventional transmission systems, the video signal is compressed on a block-by-block basis by using, e.g., DCT (Discrete Cosine Transform) and motion compensation techniques; and the compressed video signal is transmitted to a receiving end through a noisy transmission channel, entailing data losses or damages in the transmitted video signal. Such transmission systems, however, do not provide sufficient overhead mechanism to restore all errors, but rather depend on error concealment at the receiving end in order to supply substitution data for approximating the unrestored data.

In such a conventional error concealment scheme, a lost block(which has not been restored) and its neighboring blocks are detected first in the transmitted video signal. That is, as shown in FIG. 4, a lost block, e.g., block 0, and neighboring blocks thereof, e.g., blocks 1 to 8, circumscribing the lost block, are determined. Subsequently, each pixel value within the lost block is compensated by a weighted mean value SB defined as follows:

$$SB = \frac{W_1}{4}(\overline{B}_1+\overline{B}_3+\overline{B}_6+\overline{B}_8) + \frac{W_2}{4}(\overline{B}_2+\overline{B}_4+\overline{B}_5+\overline{B}_7) \quad \text{EQ. 1}$$

$$W_1 + W_2 = 1$$

wherein $W_1$ and $W_2$ denote predetermined weight factors, respectively; and $B_i$ represents an average value of all pixel values of an ith neighboring block with i ranging from 1 to 8.

Since, however, the error concealment technique described above generates the lost block data by merely averaging all pixel values of the neighboring blocks without taking into account image particularities, e.g., edges, which may exist in the neighboring blocks, such substitution data may not be able to properly reflect the original image data of the lost block.

SUMMARY OF THE INVENTION

It is, therefore, an object of the invention to provide a method and apparatus capable of improving image quality by concealing errors in a transmitted video signal based on edge information included therein.

In accordance with one aspect of the present invention, there is provided a method, for use in a video signal decoding system, for concealing errors in a video signal transmitted in a compressed form, wherein the video signal is divided into a plurality of blocks each of which has N×M pixel values with N and M being positive integers, the method comprising the steps of: detecting a lost block containing errors; providing pixel values of blocks neighboring the lost block in the video signal; calculating an edge gradient at each of neighboring pixels included in a predetermined range of pixels surrounding the lost block based on the pixel values of the neighboring blocks and computing a magnitude and an angle of each of the edge gradients; generating a spatially interpolated block based on the edge gradients and the pixel values of the neighboring blocks; and providing the spatially interpolated block as a substitution block for compensating the lost block.

In accordance with another aspect of the present invention, there is provided an apparatus, for use in a video signal decoding system, for concealing errors in a video signal transmitted in a compressed form, wherein the video signal is divided into a plurality of blocks each of which has N×M pixel values with N and M being positive integers, which comprises: a lost block detector for detecting a lost block containing errors; a neighboring block determination circuit for providing pixel values of blocks neighboring the lost block in the video signal; a gradient calculator for computing an edge gradient at each of neighboring pixels included in a predetermined range of pixels surrounding the lost block based on the pixel values of the neighboring blocks and calculating a magnitude and an angle of each of the edge gradients; a direction determination circuit for determining a pixel interpolation direction based on the edge gradients of neighboring pixels; a block generator for producing a spatially interpolated block based on the pixel values of the neighboring blocks and the pixel interpolation direction; and a contribution circuit for providing the spatially interpolated block as a substitution block for compensating the lost block.

BRIEF DESCRIPTION OF THE DRAWINGS

The above and other objects and features of the present invention will become apparent from the following description of preferred embodiments given in conjunction with the accompanying drawings, in which:

FIGS. 2A and 2B represent an error concealment circuit 300 in FIG. 1 in accordance with the preferred embodiments of the present invention, respectively;

FIG. 4 offers a schematic representation of a lost block and its neighboring blocks in a video signal.

DETAILED DESCRIPTION OF THE PREFERRED EMBODIMENTS

Figure 1:
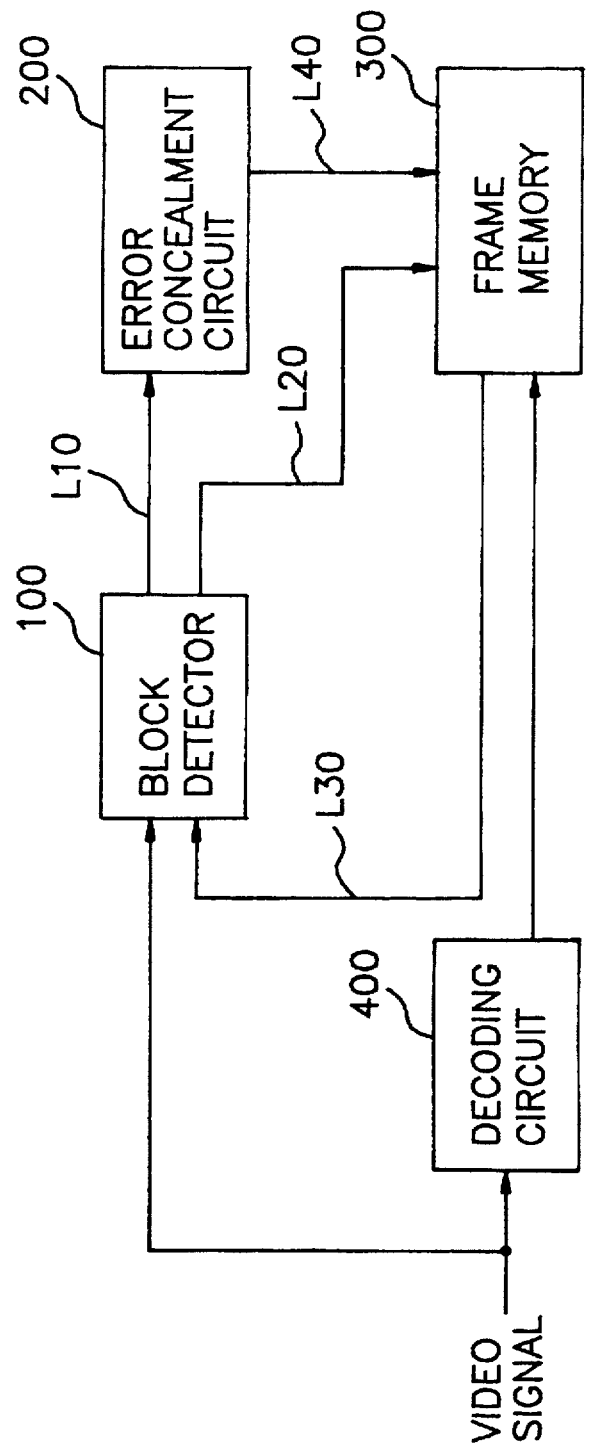
FIG. 1 shows a schematic block diagram of an error concealment system.

Referring to FIG. 1, a video signal is decoded at a decoding circuit 400 through the use of conventional decoding techniques such as a variable length decoding, an inverse quantization and an inverse DCT, the video signal being divided into a multiplicity of blocks, e.g., a block of N×M pixels with N and M being positive integers. And, the decoded video signal is stored at a frame memory 300.

The video signal is also fed to a block detector 100 and the block detector 100 first checks a lost block in the video signal to thereby provide lost block information including

3 position data representing the position of the lost block in the video signal onto a line L20, the lost block having lost or damaged pixel values; and provides neighboring block information retrieved through a line L30 from the decoded video signal stored at the frame memory 300 based on the lost block information to an error concealment circuit 200 via a line L10, the neighboring block information including pixel values for each of neighboring blocks for the lost block.

The error concealment circuit 200 generates a substitution block for compensating the lost block within the video signal, the substitution block being produced based on the neighboring block information on the line L10 from the block detector 100.

In FIGS. 2A and 2B, there are represented detailed block diagrams of the error concealment circuit 200 shown in FIG. 1 in accordance with the preferred embodiments of the present invention. And, a direction classification unit 210 commonly included in FIGS. 2A and 2B is described in FIG. 3 in more detail. The structure of the error concealment circuit 200 and its operation will be understood with reference to FIGS. 2A, 2B and 3.

First of all, the direction classification unit 210 and a comparison unit 220 which are commonly used in the preferred embodiments given in conjunction with FIGS. 2A and 2B will be introduced with reference to the drawings.

Figure 3:
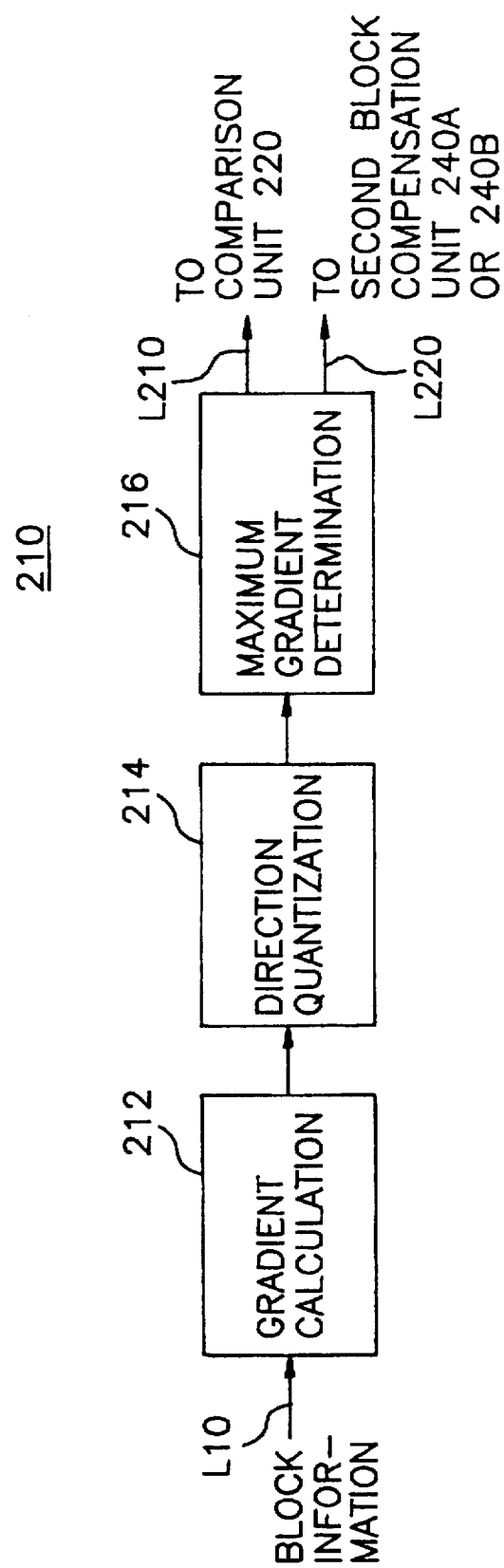
FIG. 3 denotes a detailed block diagram of a direction classification unit 210 shown in FIGS. 2A or 2B.

The neighboring block information on the line L10 from the block detector 100 is coupled to a direction classification unit 210 having a gradient calculation sector 212, a direction quantization sector 214 and a maximum gradient determination sector 216 as shown in FIG. 3. Subsequently, the gradient calculation sector 212 computes gradients at neighboring pixels included in a predetermined range of pixels, e.g., three or four rows and columns of pixels, surrounding the lost block, by using gradient measures in the spatial domain based on the neighboring block information. The local edge gradients Gx and Gy at a pixel location x(i,j) of the neighboring pixels are first determined as follows:

$$Gx = x_{i-1,j+1} - x_{i-1,j-1} + 2x_{i,j+1} - 2x_{i,j-1} + x_{i+1,j+1} - x_{i+1,j-1} \quad \text{EQ. 2}$$

$$Gy = x_{i-1,j-1} - x_{i+1,j-1} + 2x_{i-1,j} - 2x_{i+1,j} + x_{i-1,j+1} - x_{i+1,j+1} \quad \text{EQ. 3}$$

wherein $x_{ij}$ represents a pixel value at the pixel location x(i,j), i and j being positive integers representing the pixel position in the block along the horizontal and the vertical direction, respectively. This is equivalent to applying the following 3×3 Sobel operators to the neighboring pixels.

$$Gx = \begin{bmatrix} -1 & 0 & 1 \\ -2 & 0 & 2 \\ -1 & 0 & 1 \end{bmatrix}$$

$$Gx = \begin{bmatrix} 1 & 2 & 1 \\ 0 & 0 & 0 \\ -1 & -2 & -1 \end{bmatrix}$$

Based on the local edge gradients Gx and Gy computed according to the EQ. 2 and EQ. 3, the magnitude, Gmag, and angle, Gpha, of the gradient at the pixel location x(i,j) are given as follows:

$$Gmag = \sqrt{Gx^2 + Gy^2} \quad \text{EQ. 4}$$

4

-continued $$Gpha = \tan^{-1}\left(\frac{Gy}{Gx}\right) \quad \text{EQ. 5}$$

The above gradient measures are calculated for each of the neighboring pixels surrounding the lost block and the results, i.e., the magnitude and angle of the gradient for each of the neighboring pixels are provided to the direction quantization sector 214.

At the direction quantization sector 214, the angles coupled thereto are rounded to, e.g., the nearest multiple of 45 degrees and, thereafter, each of them corresponds to one of four directional categories D1 to D4 which represent, e.g., horizontal, vertical, diagonally ascending and diagonally descending directions, respectively. Each gradient along one of the four directional categories D1 to D4 is fed to the maximum gradient determination sector 216.

At maximum gradient determination sector 216, if a line drawn from the pixel location x(i,j) along the direction determined by the angle of the gradient thereat passes through the lost block, then that particular pixel location x(i,j) is classified as a voting pixel. The directional categories D1 to D4 at the voting pixel locations are mutually exclusively accumulated by summing the magnitudes of the associated directional gradients. That is, the magnitudes of the gradients at the voting pixel locations classified to a directional category D1 are accumulated to thereby produce a first sum, the magnitudes of the gradients of the voting pixel locations contained in a directional category D2 are accumulated to thereby provide a second sum and so on. By comparing the sums for the directional categories D1 to D4 with one another, the sector 216 selects a directional category exhibiting a largest accumulated sum as a pixel interpolation direction. The selected directional category and the associated sum are supplied to a second block compensation block 240A or 240B via a line L220 and the comparison unit 220 through a line L210, respectively.

Referring back to FIGS. 2A or 2B, the sum corresponding to the selected directional category is compared with a predetermined threshold value at the comparison unit 220 in order to provide selection signals to a selection unit 250A or 250B.

Meantime, in accordance with the preferred embodiment of the present invention, the neighboring block information from the block detector 100 is also fed to a first and the second block compensation units 230A and 240A as shown in FIG. 2A.

At the first compensation unit 230A, a first compensated block is produced by using the before-mentioned conventional error concealment technique replacing each pixel value of the lost block with the weighted mean value of pixel values of the neighboring blocks for the lost block.

The second block compensation unit 240A makes a second compensated block through the use of a directional interpolation based on pixel values of the neighboring blocks along the direction corresponding to the selected directional category, the direction interpolation generating pixel values by performing one dimensional interpolation along a particular direction. For example, if the directional category D1 representing the horizontal direction is chosen as the pixel interpolation direction, the second block compensation unit 240A first calculates an average value of all pixel values of each of the blocks 4 and 5; computes a mean value of the average values for the blocks 4 and 5; and constructs the second compensated block, each pixel value of the second compensated block being the mean value. Likewise, the respective neighboring blocks 2 and 7, 3 and 6, and 1 and 8 along the directions corresponding to the rest directional categories D2, D3 and D4, respectively can be also used for producing the second compensated block in the same manner as this process. The first and the second compensated blocks produced as above are supplied to the selection unit 250A.

The selection unit 250A chooses either the first compensated block from the first block compensation unit 230A or the second compensated block from the second block compensation unit 240A in response to the selection signals outputted from the comparison unit 220. That is, if the sum corresponding to the selected directional category is smaller than the predetermined threshold value, the first compensated block is provided to the frame memory 300 via a line L40 as the substitution block, and, if otherwise, the second compensated block is supplied to the memory 300.

On the other hand, in accordance to another preferred embodiment of the present invention with reference to FIG. 2B, the neighboring block information coupled to the error concealment circuit 200 through the line L10 is converted through the use of the discrete cosine transform at a DCT unit 260. The transformed neighboring block information is fed to a first and the second block compensation units 230B and 240B.

At the first block compensation unit 230B, a first compensated DCT block is produced based on the transformed neighboring block information. Each DCT coefficient $SC_{ij}$ of the first compensated DCT block is calculated by:

$$SC_{ij} = \sum_{k=1}^{8} W_k Bk_{ij} \qquad \text{EQ. 6}$$

$$\sum_{k=1}^{8} W_k = 1$$

wherein $W_k$ represents a predetermined weight factor for a kth transformed neighboring block for the lost block; $Bk_{ij}$ denotes an ijth DCT coefficient of the kth transformed neighboring block; k varies from 1 to 8; i ranges from 1 to N; and j ranges from 1 to M.

In the preferred embodiment of the present invention, when the DCT coefficient $SC_{ij}$ is computed according to the EQ. 6, all the weight factors for the vertically and horizontally neighboring blocks are identical and, likewise, all the weight factors for the diagonally neighboring blocks are also identical. That is, referring to FIG. 4, the weight factors for the blocks 2, 4, 5 and 7 are same and those for the blocks 1, 3, 6 and 8 are identical.

In the meantime, the second block compensation unit 240B generates a second compensated DCT block based on the transformed neighboring block information from the DCT unit 260 and the selected directional category from the maximum gradient determination sector 216 in the direction classification unit 210. That is to say, each DCT coefficient of the second compensated DCT block is determined by averaging two DCT coefficients selected from the two neighboring blocks along the direction corresponding to the selected directional category, the two DCT coefficients being of a same frequency of the two neighboring blocks. The neighboring blocks along the directions corresponding to the directional categories D1, D2, D3 and D4 are also determined as before-mentioned. Therefore, if the directional category D1 is chosen as the pixel interpolation direction, the second block compensation unit 240B also produces the second compensated DCT block by using DCT coefficients of the blocks 4 and 5 in FIG. 4. For the respective blocks related to the rest directional categories, this process can be applied in the same manner. The first and the second compensated DCT blocks from the first and the second block compensation units 230B and 240B, respectively, are supplied to the selection unit 250B.

At the selection unit 250B, likewise in the former preferred embodiment of the present invention, one of the first and the second compensated DCT blocks is selected in response to the selection signals outputted from the comparison unit 220 and it is fed to an IDCT unit 270. That is to say, as the result of the comparison process at the comparison unit 220, if the sum corresponding to the selected directional category is smaller than the predetermined threshold value, the first compensated DCT block is provided to the IDCT unit 270, and, if otherwise, the second compensated DCT block is supplied to the IDCT unit 270.

The IDCT unit 270 inversely transforms the selected block from the selection unit 250B by using an inverse discrete cosine transform and provides it to the frame memory 300 via the line L40 as the substitution block.

The lost block in the video signal is compensated by the substitution block on the line L40 supplied from the selection unit 250A or the IDCT unit 270 at the frame memory 300 based on the lost block information from the block detector 100.

While the present invention has been shown and described in connection with the preferred embodiments only, it will be readily apparent to those of ordinary skill in the art that many changes and modifications may be made without departing from the spirit and scope of the invention as defined in the appended claims.

What is claimed is:

1. A method, for use in a video signal decoding system, for concealing errors in a video signal transmitted in a compressed form, wherein the video signal is divided into a plurality of blocks each of which has N×M pixel values with N and M being positive integers, the method comprising the steps of:

(a) detecting a lost block containing errors;

(b) providing pixel values of blocks neighboring the lost block in the video signal;

(c) calculating an edge gradient at each of neighboring pixels included in a predetermined range of pixels surrounding the lost block based on the pixel values of the neighboring blocks and computing a magnitude and an angle of each of the edge gradients;

(d) generating a spatially interpolated block based on the edge gradients and the pixel values of the neighboring blocks; and (e) providing the spatially interpolated block as a substitution block for compensating the lost block, wherein the step (d) includes the steps of:

(d1) classifying the angle of the edge gradient at each of the neighboring pixels along with one of predetermined directional indicators with which the angle of the edge gradient is most closely aligned;

(d2) if a line drawn through a neighboring pixel location along the direction determined by the angle of the gradient at the neighboring pixel passes through the lost block, determining that particular pixel as a voting pixel;

(d3) summing up the magnitudes of the gradients aligned with each directional indicator in order to mutually exclusively accumulate the directional indicators of the voting pixels;

(d4) selecting the directional indicator exhibiting a largest accumulated sum as a pixel interpolation direction by comparing the sum of the magnitudes for each of the directional indicators with one another;

(d5) comparing the largest accumulated sum with a predetermined threshold value; and (d6) if the largest accumulated sum is larger than or equal to the predetermined threshold value, producing the spatially interpolated block through the use of a directional interpolation based on pixel values of the neighboring blocks along the pixel interpolation direction.

2. The method as recited in claim 1, wherein the edge gradients are computed through the use of a Sobel operator.

3. The method as recited in claim 1, wherein the edge gradients are determined for three or four rows and columns of pixels surrounding the lost block.

4. The method as recited in claim 1, wherein the directional indicators contain four indicators, representing horizontal, vertical, diagonally ascending and diagonally descending directions, respectively.

5. The method as recited in claim 1, wherein the step (d6) further includes the steps of:

(d611) computing an average value of all pixel values of each of the neighboring blocks along the pixel interpolation direction;

(d612) calculating a mean value of the average values for the neighboring blocks along the pixel interpolation direction; and (d613) generating the spatially interpolated block whose pixel values are determined as the mean value.

6. The method as recited in claim 1, wherein the step (d6) further includes the step of:

(d631) generating, if the largest accumulated sum is smaller than the predetermined threshold value, the spatially interpolated block based on a weighted mean value of all pixel values of the neighboring blocks for the lost block.

7. The method as recited in claim 1, wherein the step (d6) further includes the steps of:

(d621) converting the neighboring blocks along the pixel interpolation direction to transformed neighboring blocks each of which has N×M number of DCT coefficients through the use of a discrete cosine transform;

(d622) generating a directionally interpolated block through the use of a directional interpolation based on the transformed neighboring blocks along the pixel interpolation direction; and (d623) producing the spatially interpolated block by inversely transforming the directionally interpolated block through the use of an inverse discrete cosine transform.

8. The method as recited in claim 7, wherein each DCT coefficient of the directionally interpolated block is determined by averaging DCT coefficients selected from the transformed neighboring blocks along the pixel interpolation direction, said selected DCT coefficients being of a same frequency in the transformed neighboring blocks along the pixel interpolation direction.

9. The method as recited in claim 1, wherein the step (d6) further includes the steps of:

(d641) converting the neighboring blocks for the lost block to transformed neighboring blocks each of which has N×M number of DCT coefficients through the use of a discrete cosine transform;

(d642) producing, if the largest accumulated sum is smaller than the predetermined threshold value, an averaged block based on the transformed neighboring blocks for the lost block; and (d643) producing the spatially interpolated block by inversely transforming the averaged block through the use of an inverse discrete cosine transform.

10. The method as recited in claim 9, wherein each DCT coefficient $S_{ij}$ of the averaged block is determined as:

$$SC_{ij} = \sum_{k=1}^{8} W_k Bk_{ij}$$

$$\sum_{k=1}^{8} W_k = 1$$

wherein $W_k$ represents a predetermined weight factor for a kth transformed neighboring block for the lost block; $Bk_{ij}$ denotes an ijth DCT coefficient of the kth transformed neighboring block; k ranges from 1 to 8; i ranges from 1 to N; and j ranges from 1 to M.

11. An apparatus, for use in a video signal decoding system, for concealing errors in a video signal transmitted in a compressed form, wherein the video signal is divided into a plurality of blocks each of which has N×M pixel values with N and M being positive integers, which comprises:

means for detecting a lost block containing errors;

means for providing pixel values of blocks neighboring the lost block in the video signal;

a gradient calculation means for computing an edge gradient at each of neighboring pixels included in a predetermined range of pixels surrounding the lost block based on the pixel values of the neighboring blocks and calculating a magnitude and an angle of each of the edge gradients;

a direction determination means for determining a pixel interpolation direction based on the edge gradients of neighboring pixels;

a block generation means for producing a spatially interpolated block based on the pixel values of the neighboring blocks and the pixel interpolation direction; and a contribution means for providing the spatially interpolated block as a substitution block for compensating the lost block, wherein the gradients are computed through the use of a Sobel operator.

12. The apparatus according to claim 11, wherein the gradient calculation means ciphers the edge gradients of three or four rows and columns of pixels surrounding the lost block.

13. An apparatus, for use in a video signal decoding system, for concealing errors in a video signal transmitted in a compressed form, wherein the video signal is divided into a plurality of blocks each of which has N×M pixel values with N and M being positive integers, which comprises:

means for detecting a lost block containing errors;

means for providing pixel values of blocks neighboring the lost block in the video signal;

a gradient calculation means for computing an edge gradient at each of neighboring pixels included in a predetermined range of pixels surrounding the lost block based on the pixel values of the neighboring blocks and calculating a magnitude and an angle of each of the edge gradients;

a direction determination means for determining a pixel interpolation direction based on the edge gradients of neighboring pixels;

a block generation means for producing a spatially interpolated block based on the pixel values of the neighboring blocks and the pixel interpolation direction; and a contribution means for providing the spatially interpolated block as a substitution block for compensating the lost block.

wherein the direction determination means includes:

means for classifying the angle of the edge gradient at each of the neighboring pixels along with one of predetermined directional indicators with which the angle of the edge gradient is most closely aligned;

means for determining, if a line drawn through a neighboring pixel location along the direction determined by the angle of the gradient at the neighboring pixel passes through the lost block, that particular pixel as a voting pixel;

means for summing up the magnitudes of the gradients aligned with each directional indicator in order to mutually exclusively accumulate the directional indicators of the voting pixels; and means for selecting the directional indicator exhibiting a largest accumulated sum as the pixel interpolation direction by comparing the sum of the magnitudes for each of the directional indicators with one another.

14. The apparatus according to claim 13, wherein the directional indicators contain four indicators, representing horizontal, vertical, diagonally ascending and diagonally descending directions, respectively.

15. The apparatus according to claim 13, wherein the block generation means produces the spatially interpolated block through the use of a directional interpolation based on the neighboring blocks corresponding to the pixel interpolation direction.

16. The apparatus according to claim 15, wherein the block generation means includes:

means for computing an average value of all pixel values of each of the neighboring blocks along the pixel interpolation direction;

means for calculating a mean value of the average values for the neighboring blocks along the pixel interpolation direction; and means for generating the spatially interpolated block whose pixel values are determined as the mean value.

17. The apparatus according to claim 13, wherein the block generation means includes:

means for converting the neighboring blocks for the lost block to transformed neighboring blocks for the lost block each of which has N×M number of DCT coefficients through the use of a discrete cosine transform;

means for generating a directionally interpolated block through the use of a directional interpolation based on the transformed neighboring blocks along the pixel interpolation direction; and means for producing the spatially interpolated block by inversely transforming the directionally interpolated block through the use of an inverse discrete cosine transform.

18. The apparatus according to claim 17, wherein each DCT coefficient of the directionally interpolated block is determined by averaging DCT coefficients selected from the transformed neighboring blocks along the pixel interpolation direction, said selected DCT coefficients being of a same frequency in the transformed neighboring blocks along the pixel interpolation direction.

19. The apparatus according to claim 13, wherein the block generation means includes:

means for generating a directionally interpolated block through the use of a directional interpolation based on the neighboring blocks along the pixel interpolation direction;

means for producing an averaged block whose pixel values are determined as a weighted mean value of pixel values of the neighboring blocks for the lost block;

a comparison means for comparing the largest accumulated sum with a predetermined threshold value to thereby provide comparison signals; and a selection means for choosing, in response to the comparison signals, either the directionally interpolated block or the averaged block as the spatially interpolated block.

20. The apparatus according to claim 19, wherein the comparison means provides a first comparison signal if the largest accumulated sum is larger than or equal to the predetermined threshold value and, if otherwise, supplies a second comparison signal.

21. The apparatus according to claim 20, wherein the selection means includes:

means for providing, in response to the first comparison signal, the directionally interpolated block as the spatially interpolated block; and means for supplying, in response to the second comparison signal, the averaged block as the spatially interpolated block.

22. The apparatus according to claim 13, wherein the block generation means includes:

means for converting the neighboring blocks for the lost block to transformed neighboring blocks for the lost block each of which has N×M number of DCT coefficients through the use of a discrete cosine transform;

means for generating a directionally interpolated block through the use of a directional interpolation based on the transformed neighboring blocks along the pixel interpolation direction;

means for producing an averaged block based on the transformed neighboring blocks for the lost block;

a comparison means for comparing the largest accumulated sum with a predetermined threshold value to thereby provide comparison signals;

a selection means for choosing, in response to the comparison signals, either the directionally interpolated block or the averaged block; and means for producing the spatially interpolated block by inversely transforming the selected block through the use of an inverse discrete cosine transform.

23. The apparatus according to claim 22, wherein each DCT coefficient $S_{ij}$ of the averaged block is determined as:

$$SC_{ij} = \sum_{k=1}^{8} W_k B k_{ij}$$

$$\sum_{k=1}^{8} W_k = 1$$

wherein $W_k$ represents a predetermined weight factor for a kth transformed neighboring block for the lost block; $Bk_{ij}$ denotes an ijth DCT coefficient of the kth transformed neighboring block; k ranges from 1 to 8; i ranges from 1 to N; and j ranges from 1 to M.

24. The apparatus according to claim 23, wherein the comparison means provides a first comparison signal if the largest accumulated sum is larger than or equal to the predetermined threshold value and, if otherwise, supplies a second comparison signal.

25. The apparatus according to claim 24, wherein the selection means includes:

means for providing, in response to the first comparison signal, the directionally interpolated block as the selected block; and means for supplying, in response to the second comparison signal, the averaged block as the selected block.

* * * * *